United States Patent [19]

Shimizu

[11] Patent Number: 5,412,530
[45] Date of Patent: May 2, 1995

[54] PHASE DETECTING ACTUATOR

[75] Inventor: Motoharu Shimizu, Kumagaya, Japan

[73] Assignee: Hitachi Metals, Ltd., Tokyo, Japan

[21] Appl. No.: 920,333

[22] Filed: Jul. 29, 1992

[30] Foreign Application Priority Data

Jul. 30, 1991 [JP] Japan .................. 3-214395

[51] Int. Cl.⁶ .................. B62D 5/04; B62D 5/22
[52] U.S. Cl. .................. 361/185; 307/10.1; 180/142
[58] Field of Search .................. 307/9.1, 10.1, 122, 307/124; 361/139, 143–146, 147, 148, 185; 180/141, 142, 148, 79.1

[56] References Cited

U.S. PATENT DOCUMENTS

| | | | |
|---|---|---|---|
| 3,048,976 | 8/1962 | Grigsby et al. | 361/143 X |
| 3,080,507 | 3/1963 | Wickerham | 361/146 X |
| 3,112,962 | 12/1963 | Lautzenhiser | 361/143 X |
| 3,131,336 | 4/1964 | Hochwald et al. | 361/144 X |
| 3,132,290 | 5/1964 | Kumpf | 361/144 |
| 4,339,780 | 7/1982 | Okubo | 361/147 |
| 4,687,976 | 8/1987 | Shimizu | 318/432 |
| 4,761,579 | 8/1988 | Delassus | 361/143 X |
| 4,871,040 | 10/1989 | Zuraski et al. | 180/142 |
| 4,886,137 | 12/1989 | Pawlak et al. | 180/142 |
| 4,886,138 | 12/1989 | Graber et al. | 180/142 |
| 4,934,472 | 6/1990 | Bloor et al. | 180/79.1 |
| 5,038,063 | 8/1991 | Graber et al. | 180/79.1 X |
| 5,038,066 | 8/1991 | Pawlak et al. | 180/142 X |
| 5,067,576 | 11/1991 | Bober | 180/79.1 |
| 5,070,956 | 12/1991 | Pawlak et al. | 180/148 X |
| 5,075,814 | 12/1991 | Kubota et al. | 361/143 |
| 5,119,898 | 1/1992 | Eckhardt et al. | 180/142 |
| 5,161,083 | 11/1992 | Mohler et al. | 361/143 |

Primary Examiner—A. D. Pellinen
Assistant Examiner—Fritz M. Fleming
Attorney, Agent, or Firm—Finnegan, Henderson, Farabow, Garrett & Dunner

[57] ABSTRACT

A phase detecting actuator for a steering system having a rotatable steering shaft and a rotatable output shaft coupled to the steering shaft so that the output shaft is rotatable relative to the steering shaft includes a cylindrical magnet attached to and rotatable with one of the steering shaft and the output shaft of the steering system. An electromagnetic system includes a magnetic coil and first and second cylindrical poles having opposite polarities and communicating with the magnetic coil, the first and second poles attached to and rotatable with the other of the steering shaft and the output shaft of the steering system. The magnetic coil generates an input signal corresponding to magnetic flux generated by the relative rotation between the cylindrical magnet and the first and second poles, and a control unit receives the input signal from the magnetic coil and generates an output signal to energize the magnetic coil to create a magnetic positioning force between the cylindrical magnet and the first and second poles to position the output shaft relative to the steering shaft.

5 Claims, 6 Drawing Sheets

PHASE DETECTING ACTUATOR

FIELD OF THE INVENTION

This invention relates to a phase detecting actuator in which an output system subjected to an external load is connected with an operating system so as to allow phase shift, and based on the phase shift of the operating system and the output system, a control valve etc. are positioned, thereby adjusting fluid pressure to be applied to the external load, and particularly to a phase detecting actuator provided with an electromagnetic mechanism for detecting phase shift of the operating system and the output system and also having function of positioning the control valve etc.

DESCRIPTION OF THE PRIOR ART

Hydraulic power systems are used in various manual operating systems to reduce operating load by human power and to improve certainty of operation, thereby enhancing operating safety.

For example, in manually-steering operating machines such as a tractor, combined harvester and thresher, ship, etc., a power-assisted steering mechanism is adopted to assist an operator as well as to provide sure and safe steering.

In the above-mentioned conventional power-assisted steering system as shown in FIG. 8, when the steering effort by an operator is transmitted from steering part 1 to wheels 3 via rack-and-pinion mechanism 2, hydraulic pressure is applied to assist manual steering effort by hydraulic mechanism 4.

In this case, to determine the direction and magnitude of hydraulic pressure, a control valve 5 shown in FIG. 9 is used. In this control valve 5, a torsion bar 6 forming an operating system, and a pinion shaft 7 connected to the rack-and-pinion mechanism 2 to form the output system are connected to allow phase shift by the lost motion connection. When an external load is applied to torsion bar 6, the phase shift of the pinion shaft 7 and torsion bar 6 caused due to the resistance against the external load allows relative rotation between spool valve 8 and sleeve valve 9. The quantity of fluid required is supplied to a related portion of power cylinder 4 by switching and changing the fluid passage, resulting in the fluid pressure low on the reverse side, thus steering assisting power of an appropriate magnitude is applied to an appropriate direction. In other words, the control valve 5, depending on phase shift between pinion shaft 7 and torsion bar 6, functions as a phase detecting actuator to effect a certain operation.

In a conventional example shown in FIG. 9, the control valve 5 is connected with reservoir 10, pump 11 and solenoid valve 12 to construct a hydraulic mechanism as a whole.

The conventional phase detecting actuator must include the torsion bar 6 to generate torsion corresponding to the external load for the operating system to cause relative rotation between sleeve 9 and spool 8 of control valve 5 based on the phase shift between the operating system and output system as described above. This torsion bar 6 needs to be made of a material that is carefully selected to attain the necessary strength, tenacity and anti-fatigue strength and also to be accurately produced and assembled, thus making its production cost expensive.

In addition, various parts are derivatively required along with the use of the torsion bar 6. For example, a shock absorber is necessary for assistance as the torsion bar does not have vibration damping action even if a load is applied.

SUMMARY OF THE INVENTION

This invention aims to provide a phase detecting actuator which is high in accuracy and reliability and uses a small quantity of parts.

According to this invention, there is provided a phase detecting actuator comprising an output system, an operating system connected to this output system so as to allow phase shift, electromagnetic means connected to an external power source, a cylindrical permanent magnet disposed to the electromagnetic means via a magnetic action gap, and control means for controlling the quantity of conduction from the external power source to the electromagnetic means, wherein either of the output system or operating system is attached with the electromagnetic means and the other is attached with the cylindrical permanent magnet. The phase shift between the operation system and the output system is detected according to a current caused by the electromagnetic means due to the phase shift between the electromagnetic means and the cylindrical permanent magnet, and based on the input signal to the control means including the detected signal of the phase shift, the electromagnetic means is conducted by the control means to position the output system and the operating system.

DETAILED DESCRIPTION OF THE INVENTION

Figure 1:
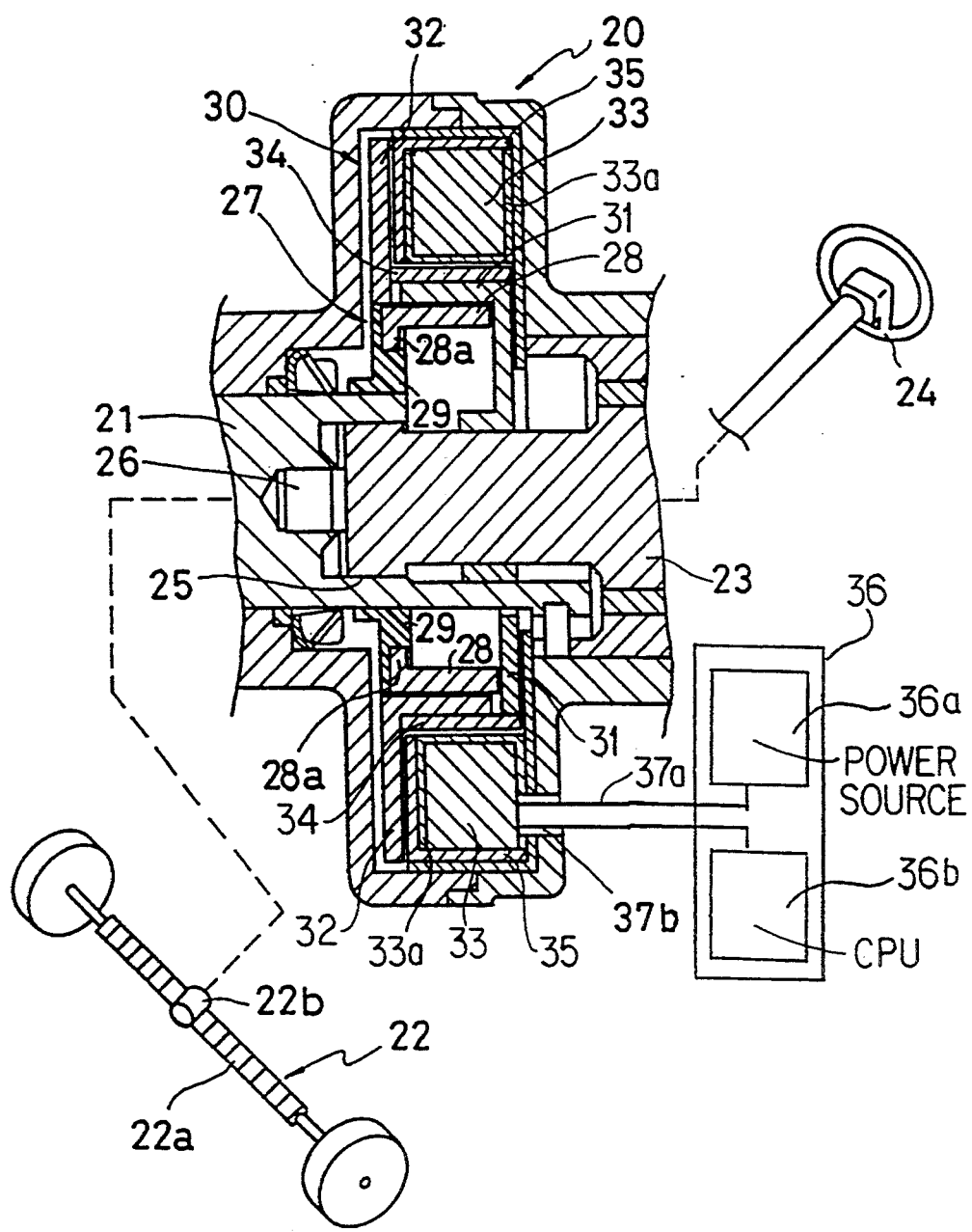
FIG. 1 is a partial sectional view showing one example of the phase detecting actuator of this invention.

According to this invention, a phase detecting actuator is provided comprising an output system, an operation system connected to this output system so as to allow phase shift, electromagnetic means connected to an external power source, a cylindrical permanent magnet disposed to the electromagnetic means via a magnetic action gap, and control means for controlling the quantity of conduction from an external power source to the electromagnetic means. Either of the output system or the operating system is attached to the electromagnetic means and the other is attached to the cylindrical permanent magnet, and the phase shift between the electromagnetic means and the cylindrical permanent magnet caused by the phase shift between the operating system and the output system due to the external load causes a current to be generated by the electromagnetic means. The phase shift between the operating system and the output system is detected based on this current in the control means. The electromagnetic means is controlled by the control means according to the input signals including the signal of the phase shift in order to position the output system and the operating system. Also, according to this invention, there is provided a phase detecting actuator, wherein the electromagnetic means consists of exciting coil and circular pole body having a plurality of pole pieces arranged circularly, and the circular pole body is magnetically connected to the exciting coil and disposed to the cylindrical permanent magnet via a magnetic action gap.

Further, according to this invention, there is provided a phase detecting actuator, wherein the electromagnetic means consists of an exciting coil and a pair of circular pole bodies having a plurality of pole pieces arranged circularly, and the pair of circular pole bodies is magnetically connected to the exciting coil so as to have reversed polarity to each other, and one of them is disposed on the inner periphery side of the cylindrical permanent magnet and the other on the outer periphery side via a magnetic action gap.

In addition, according to this invention, there is provided a phase detecting actuator, wherein the cylindrical permanent magnet consists of a cylindrical permanent magnet body and a stop part attached to a torque transmission shaft of the output system or operating system, the end of the cylindrical permanent magnet body has a flange and the flanged part is embedded in the stop part, and the cylindrical permanent magnet body and the stop part are integrally formed.

Still, according to this invention, there is provided a phase detecting actuator, wherein the cylindrical-permanent magnet body is formed in a cylindrical body having a flanged part formed by sizing.

In the above embodiments, the phase shift represents a positional displacement in the circumferential direction between two rotating bodies that rotate about the same axis.

With the phase detecting actuator of this invention, when operating power is applied to the operating system, the output system receives reaction against the external load, and phase shift is generated between the output system and the operating system connected to the output system so as to allow the phase shift. The phase shaft is formed between the aforementioned electromagnetic means and the cylindrical permanent magnet attached to either of the output system and operating system and disposed via gap for magnetic function for each other. Further, the degree and speed of phase shift of the operating system and the output system are detected based on a current caused by the electromagnetic means due to the phase shift between the electromagnetic means and the cylindrical permanent magnet. A detected signal regarding the phase shift of the operating system and the output system and another signal (i.e., a vehicle speed signal) are inputted to the control means, and based on the input signal including the detected signal, the control current by the control means is applied to the electromagnetic means, thereby magnetically positioning the output system and the operating system. A pressure, a passage and an amount of oil which are adjusted by the hydraulic control valve are determined by this positioning.

The invention is now illustrated in greater detail with reference to the following specific examples and embodiments.

EXAMPLE

FIG. 1 shows the actuator of this invention. As shown in FIG. 1, pinion 22b is formed to engage with rack 22a of mechanism 22, constituting the steering mechanism for wheels of an automobile etc., at one end of pinion shaft 21, which is an output system of phase detecting actuator 20. A steering wheel 24 is mounted at the end of steering shaft 23, which is an operating system of phase detecting actuator 20 within the automobile.

Figure 9:
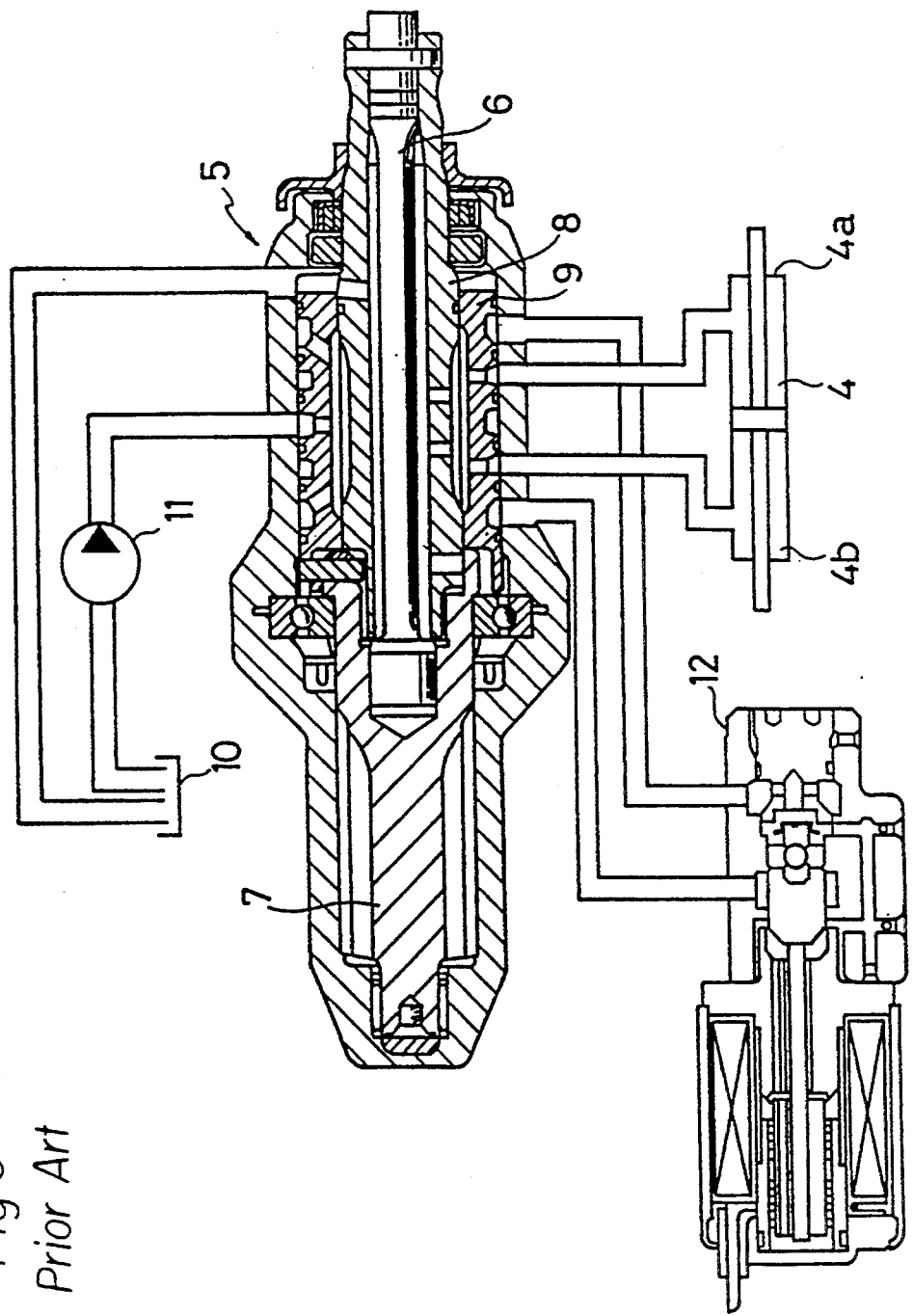
FIG. 9 is a cross-sectional view of the control valve used for the power-assisted steering device of FIG. 8. Description of Codes 20 Phase detecting actuator 21 Pinion shaft (output system) 23 Steering shaft (operating system) 33 Excitation coil (electromagnetic means) 28 Cylindrical permanent magnet 36 Control unit (control means)

The pinion shaft 21 and steering shaft 23 are mutually connected via screw part 25 and spline connecting part 26 by lost motion coupling so as to allow mutual phase shift in a certain range. The pinion shaft 21 and steering shaft 23 are respectively connected with the sleeve 9 and the spool 8 of the hydraulic control valve 5 shown in FIG. 9, and the oil passage of the hydraulic control valve 5 is opened or closed to operate the power cylinder 4 by rotating the pinion shaft 21 with the sleeve 9 and the steering shaft 23 with the spool 8 together. This power cylinder 4 is attached to the rack 22a to apply the steering operation assisting force to the rack 22a. Clockwise or counter clockwise steering operation assisting force is applied to the rack 22a by introducing the hydraulic pressure into right side chamber 4a or left side chamber 4b of the power cylinder 4.

Magnet assembly 27 is attached to the pinion shaft 21 and includes a cylindrical permanent magnet 28 which is supported to be rotatable with pinion shaft 21, pinion 22b and the sleeve 9. This cylindrical permanent magnet 28 is cylindrically and integrally formed and given with radial anisotropism. This radial anisotropic permanent magnet forms a magnetic flux passage which disperses outer peripherally in radial direction, so that it generates a very high magnetic force and efficiently utilizes the magnetic force. Since it is integrally formed into a cylindrical form, a support for cylindrically positioning several separate magnetic poles is not necessary. The magnetic assembly 27 is formed by integrally attaching a resin fastener 29 to one end of the cylindrical permanent magnet 28 and fixing the fastener 29 to the pinion shaft 21 so that the permanent magnet 28 is rotatable with the pinion shaft 21.

Flange 28a is formed at one end of the fastener 29 of the cylindrical permanent magnet 28. This flange 28a surely fixes the cylindrical permanent magnet 28 to the fastener 29 to obtain rotatable locking. This flange 28a can be formed by grinding, sizing, etc. In case of forming it by sizing, a processing step can be omitted as compared with the case of forming the flange 28a by grinding the cylindrical magnet after sintering, and there is an advantage that yield of expensive magnetic material can be improved. Ferrite magnet, Sm—Co type magnet, and Nd—Fe—B magnet can be used as the cylindrical permanent magnet of this invention, and when using the Nd—Fe—B magnet among others, sizing is suitably effected because of this material's excellent mechanical strength and particularly its toughness.

The steering shaft 23 is attached to the magnet assembly 30. This magnet assembly 30 has an excitation coil 33 which is magnetically connected to the steering shaft 23 and kept in a stationary state, and a pair of core elements 31, 32 are supported to be rotatable with the steering shaft 23.

The core elements 31, 32 are mechanically coupled by non-magnetic ring 34 and arranged to be integrally rotatable. The core element 31 is fixed to the steering shaft 23 resulting in the steering shaft 23 and the core elements 31, 32 being integrally rotated. The core element 32 is magnetically connected to the excitation coil 33 via pole piece 35 which is kept static. This excitation coil 33 is wound around a bobbin 33a and has lead ends 37a, 37b connected to control unit 36 consisting of a conventional external power source 36a and a computer unit (CPU) 36b after being drawn out from the opening formed in housing.

Figure 2:
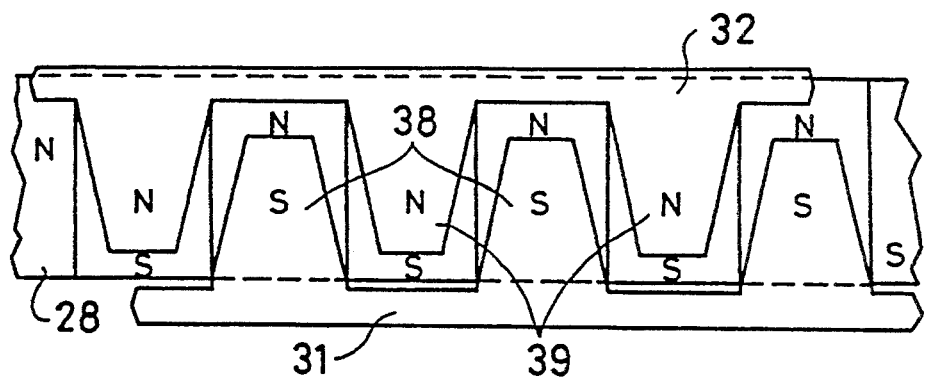
FIG. 2 is an operational explanatory view of the phase detecting actuator of the example shown in FIG. 1.

As shown in FIG. 2, the core elements 31, 32 respectively have pole teeth 38, 39 forming electromagnetic poles. These pole teeth 38, 39 are arranged in an alternating fashion so that teeth 39 are disposed in spaces between teeth 38. These pole teeth 38, 39 are arranged close to the outer periphery of the permanent magnet 28 in the radial direction to form a magnetic function gap therebetween.

When the steering shaft 23 is operated through the steering wheel 24, rotating torque generated by the operation is transmitted to the pinion shaft 21, operating rack 22b, and steering the wheels of an automobile etc. The phase shift is generated between the pinion shaft 21 and the steering shaft 23 as a reaction force due to the rack 22a is applied to the pinion shaft 21. With this, phase shift is also generated between the magnet assembly 27 fixed to the pinion shaft 21 and the magnet assembly 30 fixed to the steering shaft 23. Because of shifting of phase between the cylindrical permanent magnet 28 and the pole teeth 38, 39, induced current is generated in excitation coil 33 magnetically connected to the pole teeth 38, 39. This induced current is inputted in the control unit 36 via the lead ends 37a, 37b. In this control unit 36, various detection signals concerning a vehicle speed and travelling conditions are continuously inputted. A prescribed current is sent from the control unit 36 to the excitation coil 33 based on such signals and the above-described induced current. This current generates magnetism in the excitation coil 33, and correlation between the magnetism and the cylindrical permanent magnet 28 to generates a positioning force of the sleeve 9 fixed to the pinion shaft 21 and the spool 8 fixed to the steering shaft 23.

Conduction of current to the excitation coil 33 lets the teeth 38, 39 have different magnetic polarity as shown in FIG. 2. Magnetic flux flows in the magnetic flux passage formed by the cylindrical permanent magnet 28 and pole teeth 38, 39 and core elements 31, 32 and a positioning magnetic force is symmetrically generated in the radial directing to form isostatic state.

Figure 3:
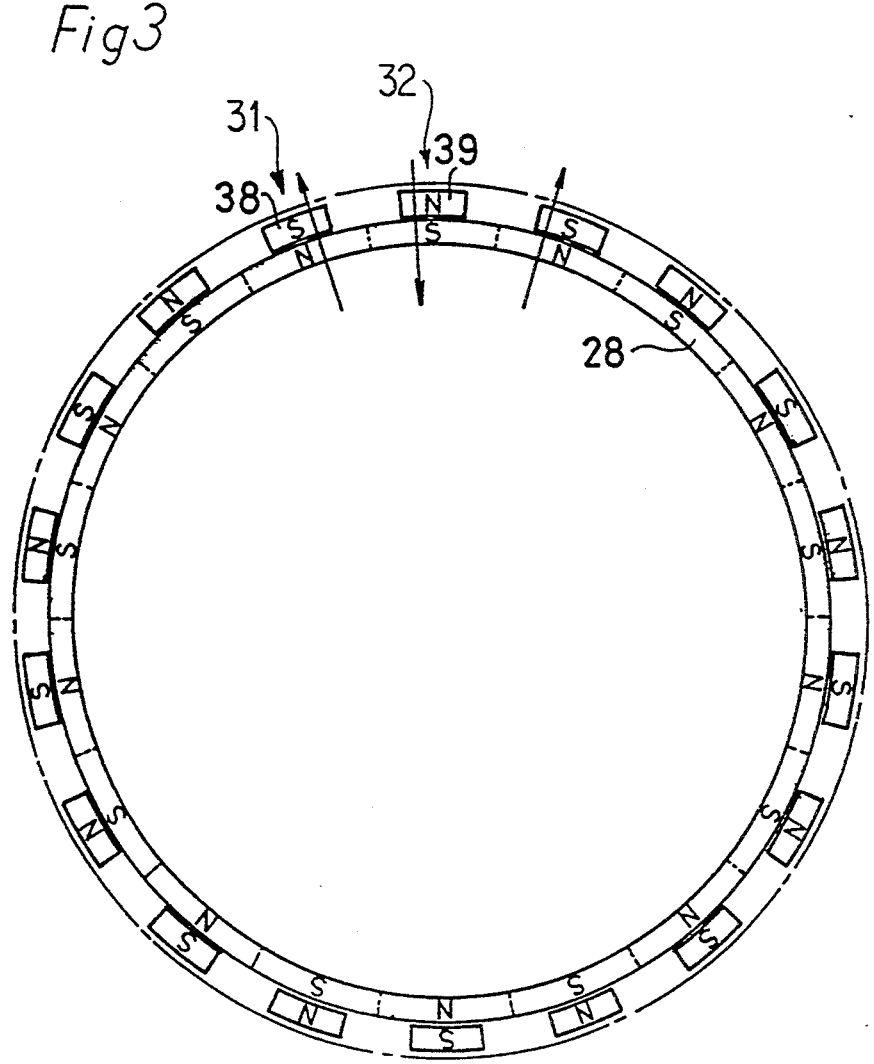
FIG. 3 is also an operational explanatory view of the phase detecting actuator of the example shown in FIG. 1.

As shown in FIG. 2 and FIG. 3, when a certain current is supplied to the excitation coil 33 in the state that the sleeve 9 and the spool 8 are in the initial position, or when the steering wheel 24 is not operated, the pole teeth 38, 39 are opposed to a magnetic pole of the cylindrical permanent magnet 28 in opposite polarity. As shown in FIG. 3, magnetic flux is dispersed in the radial direction of the cylindrical permanent magnet 28 crossing the function gap between magnetic poles of the cylindrical permanent magnet 28 in S polarity and the pole tooth 39 in N polarity, meanwhile magnetic flux is dispersed in the radial direction of the cylindrical permanent magnet 28 crossing the function gap between the magnetic poles of the cylindrical permanent magnet 28 in N polarity and the pole tooth 38 in S polarity. This state provides a magnetic flux passage with the lowest resistance to magnetic flux, so that the state is held magnetically stable.

Figure 4:
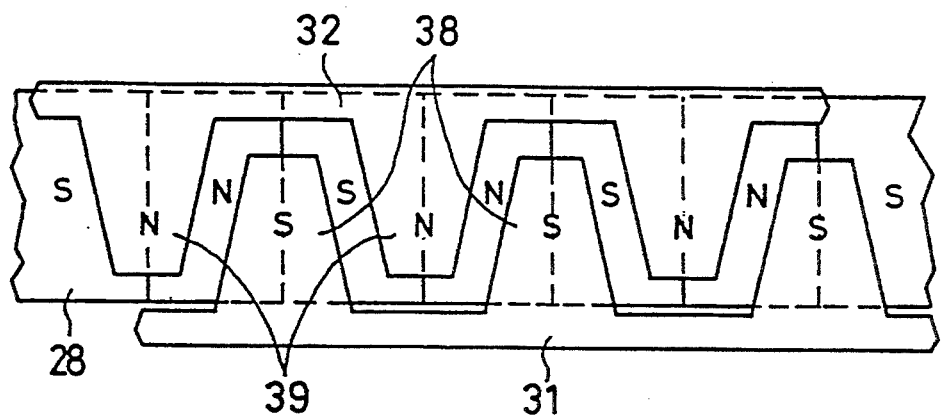
FIG. 4 is also an operational explanatory view of the phase detecting actuator of the example shown in FIG. 1.
Figure 5:
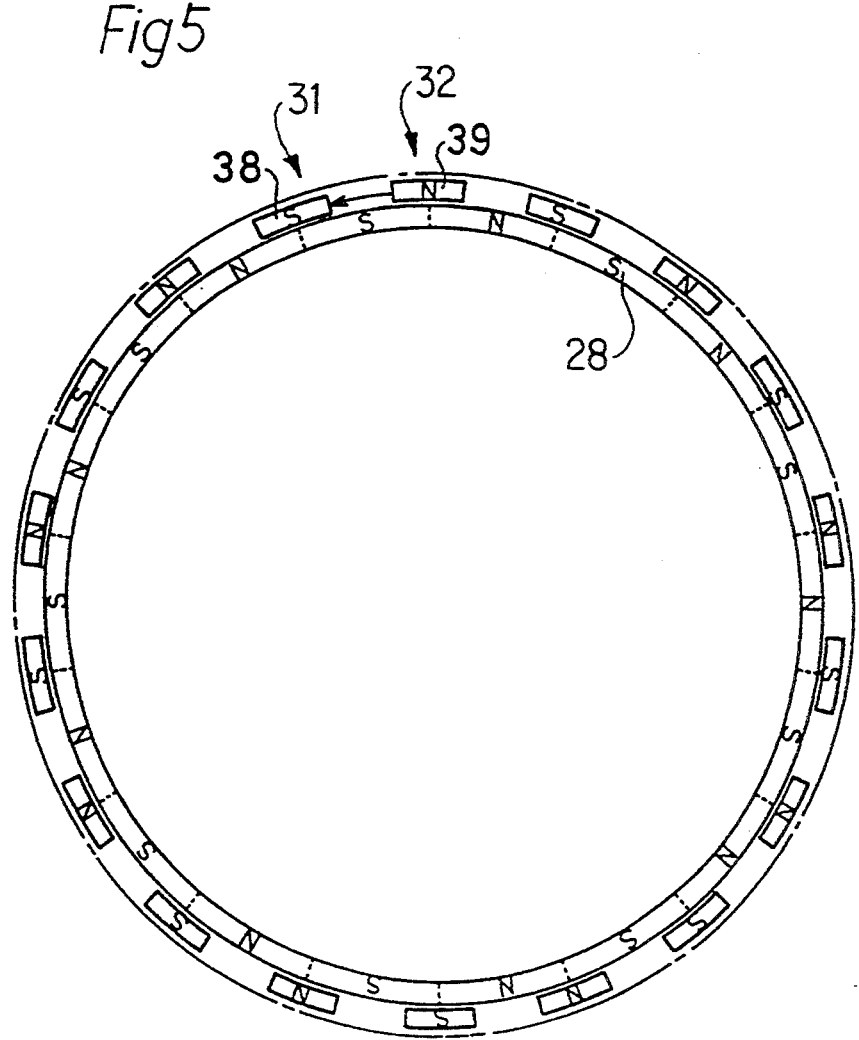
FIG. 5 is also an operational explanatory view of the phase detecting actuator of the example shown in FIG. 1.

When the steering shaft 23 is operated through the steering wheel 24, the phase shift is caused between the pinion shaft 21 and the steering shaft 23, and the pole teeth 38, 39 having opposite polarities move relative to the cylindrical permanent magnet 28 as shown in FIG. 4. Thus, as shown in FIG. 5, dispersion of line of magnetic flux is effected in the radial direction of the cylindrical permanent magnet 28, and resistance to formation of magnetic flux passage is increased. Accordingly, magnetic positioning torque generates to form more stable magnetic flux passage, and is transmitted to the control unit 36 followed by positioning the steering shaft 23 connected to the spool 8 and the pinion shaft 21 connected to the sleeve 9. The fluid pressure circuit for the control valve 5 is formed to decrease the supporting force in the operating direction by the steering wheel 24. Thus, operation of the steering wheel 24 is given some resistance needed for safety at high speed travelling of an automobile.

Magnitude of positive or negative magnetic positioning torque is properly set by current supplied from the control unit 36 based on current induced by degree of non-alignment of mutual position of the pole teeth 38, 39 and the cylindrical permanent magnet 28, or degree of phase shift between the steering shaft 23 attached with the spool 8 and the pinion shaft 21 attached with the sleeve 9, and the detection signal regarding travelling condition of the automobile etc.

Figure 6:
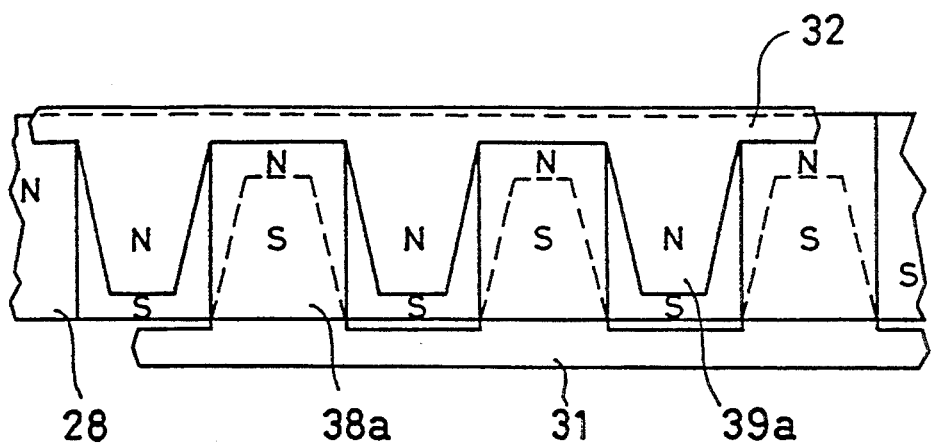
FIG. 6 is an operational explanatory view of another example of the phase detecting actuator of this invention.
Figure 7:
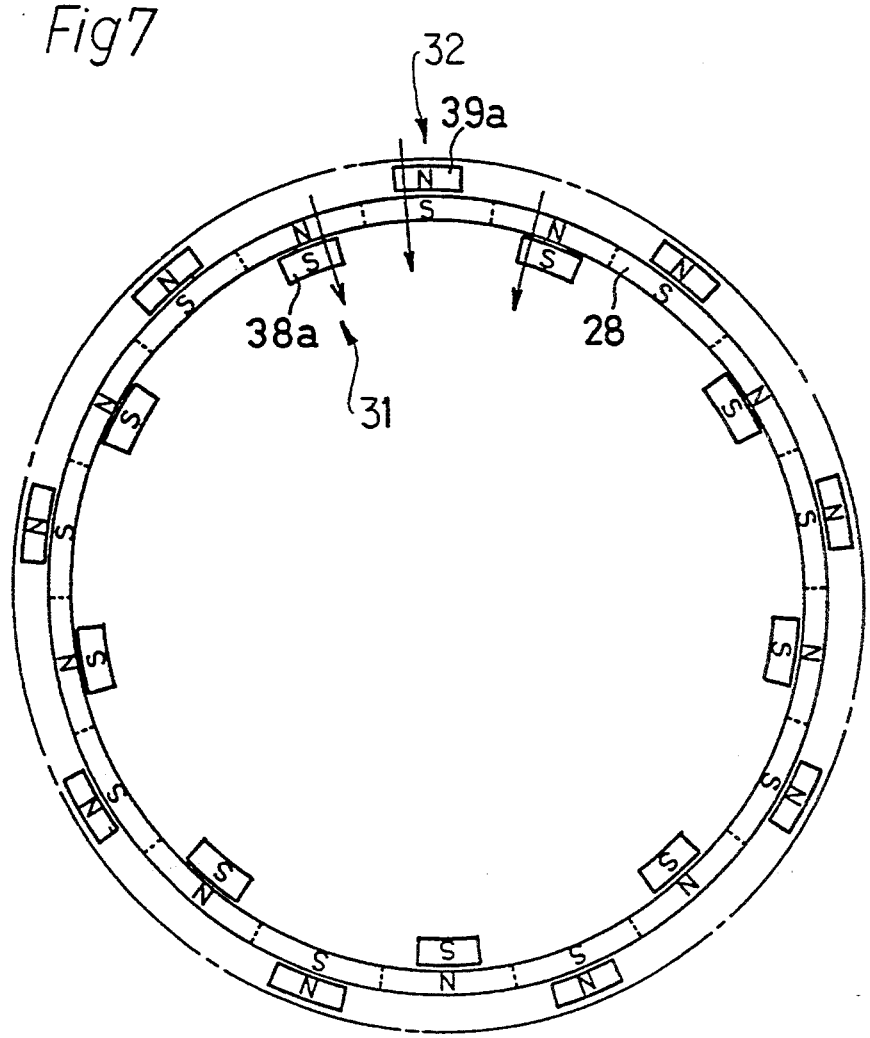
FIG. 7 is also an operational explanatory view of the example of FIG. 6.

FIG. 6 and FIG. 7 show another embodiment of the phase detecting actuator of this invention. In this embodiment, pole teeth 38a, 39a are positioned inside and outside the cylindrical permanent magnet 28. The direction of magnetic flux is arranged in one direction as illustrated resulting in enhancement of the magnetic positioning force generated by the mutual function between the pole teeth 38a, 39a and the cylindrical permanent magnet 28 in comparison to when the direction of magnetic flux between neighboring magnetic poles is opposite. The pole teeth 38a, 39a can be disposed outside and inside the cylindrical permanent magnet 28 because the magnet is formed integrally. Since a support for keeping many magnetic poles cylindrically arranged is not necessary, magnetic flux is not shielded by the support, and the pole teeth 38a, 39a can be arranged inside and outside the cylindrical permanent magnet 28.

In the above example, it is possible that the excitation coil 33 as the electromagnetic means can be attached to the pinion shaft 21 and the cylindrical permanent magnet 28 can be attached to the steering shaft 23.

Figure 8:
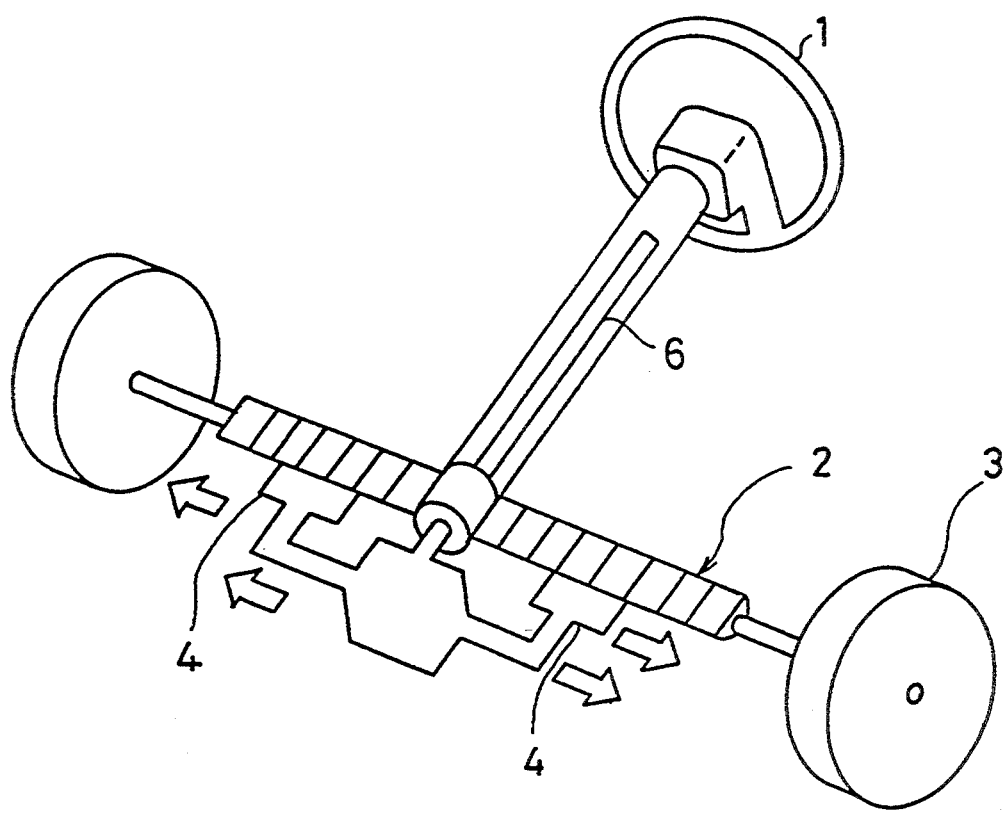
FIG. 8 is an explanatory view showing a conventional power-assisted steering device for an automobile.

Examples of this invention are not limited to those described above. For example, the steering shaft 23 can be used in combination with the torsion bar 6 shown in FIG. 8. In this case, by a combination of the positioning force of the torsion bar 6 and the magnetic positioning force, very large steering operation assisting force can be obtained.

And, by using the cylindrical permanent magnet 28 in a plural combination, and laminating with pole teeth 38, 39, magnetic positioning force can be further increased.

Output from the control means can be set to be switchable and the magnitude of steering operation assisting force can be increased or lowered by the driver's choice.

As described above, with the phase detecting actuator of this invention, the phase shift of the operating system and the output system is detected based on the current excited in the electromagnetic means by the phase shift between the electromagnetic means and the cylindrical permanent magnet, and the output system and the operating system are magnetically positioned according to the input signal including the detected signal of the phase shift to the control means after the electromagnetic means is controlled by the control means.

The invention has the advantage that mechanical positioning means such as torsion bar is not necessarily required and various process can be avoidable such as selection of materials regarding strength, toughness and fatigue strength, total precision in shapes and a process of carefully controlling the mechanical assembling precision required when using the torsion bar. In addition, any parts which are derivatively required when using the torsion bar can be omitted, making the production costs lower.

While the invention has been described in detail and with reference to specific embodiments thereof, it will be apparent to one skilled in the art that various changes and modifications can be made therein without departing from the spirit and scope thereof.

What is claimed is:

1. A phase detecting actuator for a steering system having a rotatable steering shaft and a rotatable output shaft coupled to the steering shaft so that the output shaft is rotatable relative to the steering shaft, the actuator comprising:

a cylindrical magnet attached to and rotatable with one of the steering shaft and the output shaft of the steering system, the cylindrical magnet having inner and outer peripheral surfaces;

an electromagnetic system including a magnetic coil and first and second cylindrical poles having opposite polarities and communicating with the magnetic coil, the first and second poles attached to and rotatable with the other of the steering shaft and the output shaft of the steering system, wherein the first pole faces the inner peripheral surface of the cylindrical magnet and the second pole faces the outer peripheral surface of the cylindrical magnet, the magnetic coil generating an input signal corresponding to a magnetic flux generated by relative rotation between the cylindrical magnet and the first and second poles; and control means for receiving the input signal from the magnetic coil and generating an output signal that energizes the magnetic coil to create a magnetic positioning force between the cylindrical magnet and the first and second poles to position the output shaft relative to the steering shaft.

2. The actuator of claim 1, wherein the cylindrical magnet includes a magnet body and a fastener for attaching the magnet body to one of the output shaft and the steering shaft, the magnet body including a flange embedded in the fastener.

3. The actuator of claim 2, wherein the magnet body of the cylindrical magnet is composed of Nd—Fe—B.

4. A phase detecting actuator for a steering system having a rotatable steering shaft and a rotatable output shaft coupled to the steering shaft so that the output shaft is rotatable relative to the steering shaft, the actuator comprising:

a cylindrical magnet, composed of Nd—Fe—B, attached to and rotatable with one of the steering shaft and the output shaft of the steering system;

an electromagnetic system including a magnetic coil and first and second cylindrical poles having opposite polarities and communicating with the magnetic coil, the first and second poles attached to and rotatable with the other of the steering shaft and the output shaft of the steering system and facing the cylindrical magnet, the magnetic coil generating an input signal corresponding to a magnetic flux generated by relative rotation between the cylindrical magnet and the first and second poles; and control means for receiving the input signal from the magnetic coil and generating an output signal to energize the magnetic coil to create a magnetic positioning force between the cylindrical magnet and the first and second poles to position the output shaft relative to the steering shaft.

5. The actuator of claim 4, wherein the cylindrical magnet includes a magnet body and a fastener for attaching the magnet body to the one of the output shaft and the steering shaft, the magnet body including a flange embedded in the fastener.

* * * * *